United States Patent
Brothers, III et al.

(10) Patent No.: US 12,393,400 B1
(45) Date of Patent: Aug. 19, 2025

(54) BLOCK MATCHING BETWEEN FIRST DATA AND SECOND DATA

(71) Applicant: Arm Limited, Cambridge (GB)

(72) Inventors: John Wakefield Brothers, III, Calistoga, CA (US); Metin Gokhan Ünal, Cambridge (GB); Balaji Venu, Cambridge (GB); Rune Holm, Oslo (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/431,707

(22) Filed: Feb. 2, 2024

(51) Int. Cl.
  *G06F 7/20* (2006.01)
(52) U.S. Cl.
  CPC ..................... *G06F 7/20* (2013.01)
(58) Field of Classification Search
  CPC ...... G06F 3/0608; G06F 3/061; G06F 3/0641; G06F 3/0656; G06F 3/0679; G06F 3/0688; G06F 7/20
  See application file for complete search history.

(56) References Cited

U.S. PATENT DOCUMENTS

| 10,162,568 | B2* | 12/2018 | Ji ........................... G06F 3/0688 |
| 2014/0304464 | A1* | 10/2014 | Bert ...................... G06F 3/0688 |
| | | | 711/105 |
| 2017/0300235 | A1* | 10/2017 | Maeda ................. G06F 3/0641 |
| 2021/0132835 | A1* | 5/2021 | Shabi ................... G06F 3/0641 |

* cited by examiner

*Primary Examiner* — Aracelis Ruiz
(74) *Attorney, Agent, or Firm* — EIP US LLP

(57) ABSTRACT

A processor, method, and non-transitory computer-readable storage medium for performing a block matching between first data and second data are provided. The block matching is performed using an iterative process, wherein, for each iteration, a portion of the first data and a corresponding portion of the second data is selected using a sliding window approach. When differences data, used for block matching, is calculated for a specific subset of first and second data, many of the calculations overlap with those needed for a nearby subset. Summed area table, SAT, data used for determining the difference data is continuously stored and updated in a buffer, such that overlapping computations can be avoided.

20 Claims, 9 Drawing Sheets

BLOCK MATCHING BETWEEN FIRST DATA AND SECOND DATA

BACKGROUND

Field of the Invention

The present invention relates to methods, processors, and non-transitory computer-readable storage media for handling data for block matching between first data and second data.

Description of the Related Technology

Certain data processing techniques, such as block matching between first data and second data, involve the processing and generation of considerable amounts of data for the block matching operations. It is desirable to efficiently handle the data when performing the block matching operations.

SUMMARY

According to a first aspect of the disclosure, there is provided a method for block matching performed by a processor between first data and second data, the method comprising the steps of: a) configuring a buffer in internal memory of the processor for storing summed area table, SAT, data; b) populating the buffer with initial SAT data based on a difference between at least an initial portion of the first data and second data; c) performing an iterative process, wherein each iteration of the iterative process comprises: c1) selecting a first portion in the first data and a corresponding second portion of the second data, wherein the selecting is performed using a sliding window approach, wherein a window used for selecting moves with a predefined window offset for each iteration; c2) determining a subset of the first portion and a subset of the second portion; c3) computing absolute differences, AD, data between the determined subset of the first portion and the determined subset of the second portion; c4) computing SAT data using the computed AD data and at least a portion of the SAT data stored in the buffer; c5) replacing a subset of the SAT data stored in the buffer with at least portions of the computed SAT data; c6) calculating difference data between the first portion and the second portion using the SAT data stored in the buffer, wherein the difference data comprises a difference result for each of a plurality of comparisons between the first data and the second data; and c7) storing the calculated difference data between the first portion and the second portion to memory; and d) using the stored difference data to determine matched blocks of data between the first data and second data.

According to a second aspect of the present invention, there is provided a non-transitory computer-readable storage medium comprising a set of computer-readable instructions stored thereon which, when executed by at least one processor are arranged to cause the at least one processor to perform a block matching operation between first data and second data by: a) configuring a buffer in internal memory of the processor for storing summed area table, SAT, data; b) populating the buffer with initial SAT data based on a difference between at least an initial portion of the first data and second data; c) performing an iterative process, wherein each iteration of the iterative process comprises: c1) selecting a first portion in the first data and a corresponding second portion of the second data, wherein the selecting is performed using a sliding window approach, wherein a window used for selecting moves with a predefined window offset for each iteration; c2) determining a subset of the first portion and a subset of the second portion; c3) computing absolute differences, AD, data between the determined subset of the first portion and the determined subset of the second portion; c4) computing SAT data using the computed AD data and at least a portion of the SAT data stored in the buffer; c5) replacing a subset of the SAT data stored in the buffer with at least portions of the computed SAT data; c6) calculating difference data between the first portion and the second portion using the SAT data stored in the buffer, wherein the difference data comprises a difference result for each of a plurality of comparisons between the first data and the second data; and c7) storing the calculated difference data between the first portion and the second portion to memory; and d) using the stored difference data to determine matched blocks of data between the first data and second data.

According to a third aspect of the present invention, there is provided a processing module configured to perform a block matching operation between first data and second data, the processing module configured to: obtain task data describing a block matching task to be executed between first data and second data; configure a buffer in internal memory of the processor for storing summed area table, SAT, data; populate the buffer with initial SAT data based on a difference between at least an initial portion of the first data and second data; perform an iterative process, wherein each iteration of the iterative process comprises: select a first portion in the first data and a corresponding second portion of the second data using a sliding window approach, wherein a window used for selecting moves with a predefined window offset for each iteration; determine a subset of the first portion and a subset of the second portion; compute absolute differences, AD, data between the subset of the first portion and the determined subset of the second portion; compute SAT data using the computed AD data and at least a portion of the SAT data stored in the buffer; replace a subset of the SAT data stored in the buffer with at least portions of the computed SAT data; calculate difference data between the first portion and the second portion using the SAT data stored in the buffer, wherein the difference data comprises a difference result for each of a plurality of comparisons between the first data and the second data; and store the calculated difference data between the first portion and the second portion to internal memory; and using the stored difference data to determine matched blocks of data between the first data and second data.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION

Figure 1:
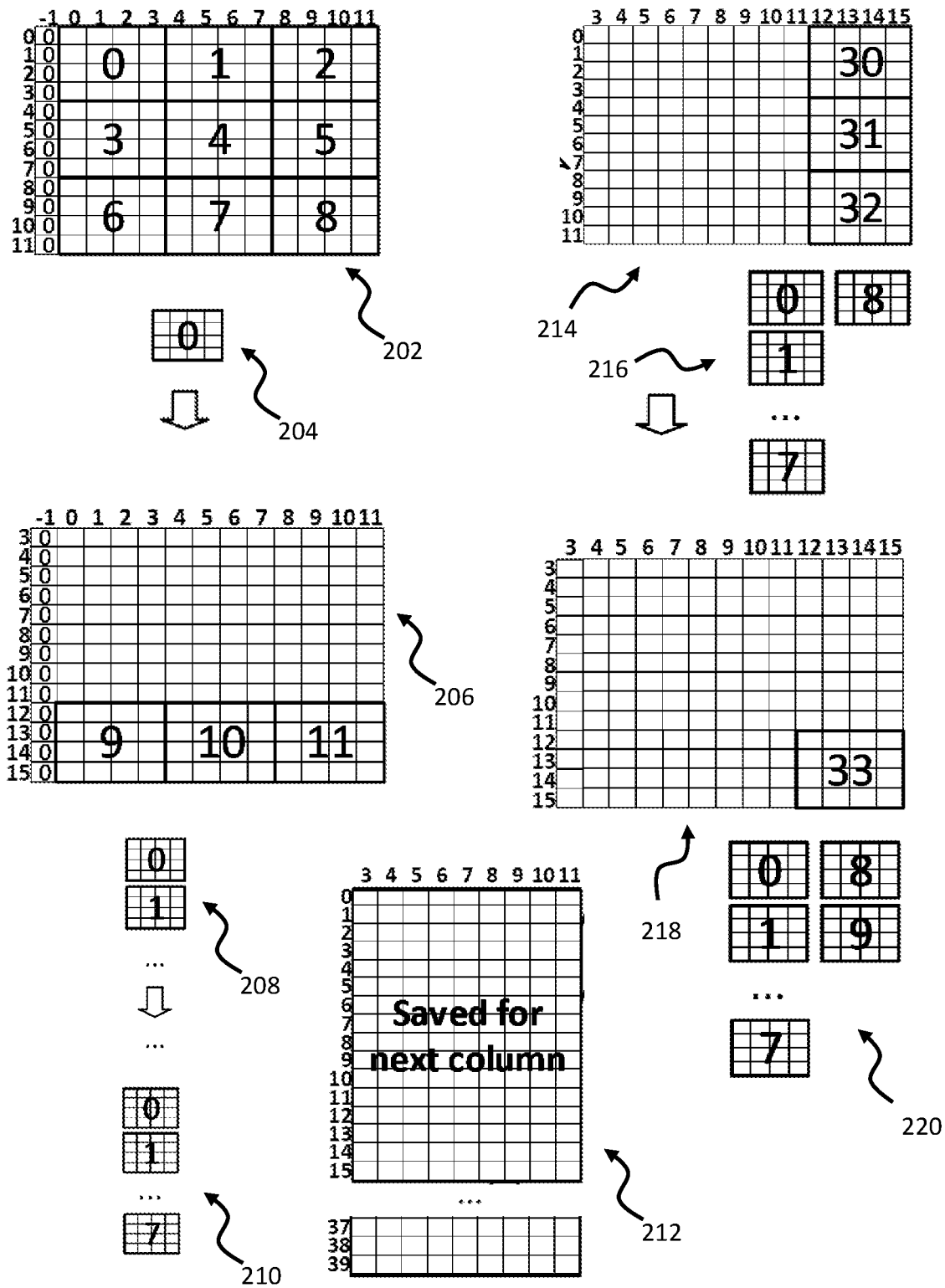
FIG. 1 illustrates processing of summed area table data to achieve sum of absolute differences data according to embodiments.

This disclosure describes procedures, as well as methods, systems, and computer-readable media for handling data for block matching operations performed by processor.

A first aspect of the disclosure relates to a method for block matching performed by a processor between first data and second data. The first data may be referred to as the first image, search frame or search data, while the second data may be referred to as the second image, template frame or template data.

Advantageously, block matching between search data and template data is performed by producing difference data between the search data and template data. When difference data is calculated in hardware, such as using a graphical processor, to get a certain throughput, the amount of logic and redundancy in calculations is advantageously minimized. The difference data, which also may be referred to as cost (smaller cost or difference yields better matches) may be embodied by one of sum of absolute differences, SAD, data, or sum of squared differences, SSD, data. In the following, SAD data will be primarily used to illustrate the block matching techniques. However, it is important to note that SSD data could also be effectively utilized in this context.

In the process of calculating difference data, such as SAD data or SSD data, a technique known as Summed Area Table (SAT) data is utilized. This technique involves deriving absolute differences (AD) data by comparing search data with template data. SAT is a data structure used in e.g., computer graphics for quickly and efficiently generating the sum of values in a subset of a grid, for example a grid of AD data, for a comparison between search data and template data. For each point in the SAT, the value is the sum of all the values above and to the left of it, inclusive. Notably, when SAD (or SSD) data is calculated for a specific subset of search and template data, many of the calculations overlap with those needed for a nearby subset. To capitalize on this, according to techniques described herein, SAT data is stored in a buffer during the block matching process between search and template data. This storage approach significantly reduces redundant calculations, enhancing the efficiency of the data processing operation.

For that reason, a buffer in internal memory of the processor for storing SAT data may be configured. The buffer is populated with initial SAT data based on differences between at least an initial portion of the search data and an initial portion of the template data.

The block matching operation is performed using an iterative process, in which a sliding window approach is utilized to select portions of the search data and the template data to process in each iteration. Each iteration comprises a plurality of steps described below.

A step comprises selection of a first portion in the first data and a corresponding second portion of the second data, wherein the selecting is performed using the sliding window approach. The window used for selecting moves with a predefined window offset for each iteration. Put differently, in the block matching operation, each iteration involves selecting specific parts of both the first (search) data and the second (template) data. This selection process employs a 'sliding window' technique. Essentially, a 'window', a defined area, is used to determine which parts of the data are selected for processing in each iteration. This window is systematically moved across the data, shifting by a predetermined amount (the window offset) in every iteration. This means that in each iteration, a new, slightly different portion of the data is selected and analysed, following the path set by the movement of the sliding window. Advantageously, a low complexity and configurable process of selecting the portions of the search data and the template data may be achieved.

A step comprises, from the selected portions of the search data (first portion) and the template data (second portion), determining a subset of each portion.

Next, AD data between the determined subset of the first portion and the determined subset of the second portion is computed. In the block matching process, after selecting subsets from both the search data (first portion) and the template data (second portion), AD data is thus computed between these subsets. As mentioned earlier, there a redundancy in the calculations needed for block matching, especially when dealing with subsets that are close to each other. To reduce this redundancy, SAT data is stored and updated regularly, aiding in the calculation of SAT data for the current subset. The sliding window method, which is used to select the data subsets, allows for predictable storage of SAT data needed for the subsequent window offset of the window. Therefore, the SAT data for the current subsets can be efficiently calculated using the newly computed AD data and at least a portion of the SAT data stored in the buffer.

The stored SAT data in the buffer is then updated by substituting a portion of it with the newly computed SAT data.

The method further comprises calculating sum of absolute differences, SAD, data between the first portion and the second portion using the SAT data stored in the buffer, wherein the SAD data comprises a SAD result for each of a plurality of comparisons between the first data and the second data; and storing the calculated SAD data between the first portion and the second portion to memory.

The SAD data is then used to determine matched block of data between the first data and the second data.

By minimizing redundant calculations as previously described and employing the sliding window technique, the volume of data that needs to be stored in the processor's internal memory may be reduced and throughput for calculating the SAD data may be increased.

In examples, the step of populating the buffer with initial SAT data involves several steps. Firstly, initial AD data is computed between the initial portion of the first data and the initial portion of the second data. Next, this initial AD data is used to calculate the initial SAT data. Once calculated, this initial SAT data is then stored in the buffer. Typically, the starting sections of the first and second data are of the same size as the window used in the previously mentioned iterative process. In essence, the step of populating the buffer with the initial SAT data can be viewed as the first step of the iterative process, although it is done without utilizing any SAT data already present in the buffer.

In examples, the method further comprises defining a template block size, wherein the step of calculating SAD data between the first portion and the second portion is performed according to the template block size. Specifically, each of the plurality of comparisons are performed according to the template block size. In summary, the template block size guides which specific corner points in the SAT data that are used for SAD calculation, enabling a more efficient computation by reducing the number of operations required to obtain the SAD for that block.

In examples, the SAD data calculated during an iteration of the iterative process comprises 16 SAD results. Advantageously, the number of calculations needed for determining the SAD data per iteration may be aligned with limitations in the processor.

In examples, the step of computing absolute differences, AD, data between the determined subset of the first portion and the determined subset of the second portion may comprise determining a subset of the first portion and a subset of the second portion not previously selected during the iterative process. Consequently, only new data, not previously processed in the search data and the template data during the iterative process is selected for processing, thus reducing the redundancy in the calculations. For instance, consider a scenario where the window's height and width are 8, making each selected portion from the first and second data an 8×8 area. However, if the sliding window moves by a window offset of 4, the upper part of these portions would have already been processed in a previous step. Consequently, the newly determined subsets for calculating AD in this iteration would be smaller, specifically an area of 8×4. This method effectively reduces the redundancy in the computational process.

In examples, a maximum size of each SAT data item is T bits, where the step of calculating SAD data between the first portion and the second portion comprises, upon determining that a SAD result for a comparison between the first portion and the second portion has a negative size, adding $2^T-1$ to the SAD result. Advantageously, a consistent bit-size for SAT data items may be achieved, which may simplify the design and implementation of processor used for block matching. Specifically, this embodiment may allow for a standardized approach to memory allocation and data processing. A fixed bit-size (T bits) for each SAT data item optimizes memory usage since the need for variable-sized data structures may be avoided. A variable-sized data structures may be more complex to manage and less efficient in terms of memory. Using the approach of the present embodiment, adding $2^T-1$ to negative SAD results, the method effectively manages overflow issues that may arise due to the limited range of T-bit representation.

In examples, T=16. Many processors and hardware platforms are optimized for 16-bit arithmetic operations. Therefore, using a 16-bit representation can lead to faster calculations and more efficient processing, which may be crucial for real-time applications or when processing large datasets.

In examples, the first data comprises a plurality of data items, wherein each SAD result is associated with a data item of the plurality of data items. The data item may for example be a pixel in case the first and second data corresponds to a first and second image.

In examples, the method according to the first aspect is performed for a plurality of search offsets. As described above block matching comparing a template data (second data above, e.g., a small block or window of pixels) with various areas of a larger image, known as the search data (first data above), to find the best matching area. This is done by systematically offsetting the position of the template over the search data. For each position (or search offset) of the template, the similarity between the template and the corresponding area in the search data is calculated, often using SAD as described above. This process is repeated for various positions (data items, pixel positions) of the template data across the search data. The goal is to find the search offset at which the template best matches a portion of the search data. This is particularly useful in applications like motion tracking, where finding the best match for a template in successive frames of a video allows for tracking the movement of objects or features. By performing block matching for each pixel or a group of pixels in the search data, the algorithm identifies where each part of the template appears in the search data, effectively mapping movement of the template data across the search data. Consequently, in this example, a corresponding second portion of the second data is selected according to the search offset. For example, if the offset is [4, 3], a portion [x, x+n, y, y+n] in the search data (first data) corresponds to a portion [x+4, x+4+n, y+3, y+3+n] in the template data (second data). Moreover, as described above, a goal is to find the search offset at which the template best matches a portion of the search data. This may be achieved by, for each data item of the plurality of data items, upon determining that the SAD result calculated for the data item is lower than the SAD result(s) calculated for all previous offsets for that data item, associating the search offset with the data item.

In some examples, upon determining that at least a threshold number of SAD results in the SAD data calculated for the search offset is below a threshold value, aborting the method and using the search offsets associated with the data items of the first data to determine matched blocks of data between the first data and second data. This early termination, or 'aborting' of the method, occurs when a sufficiently good match is detected across the datasets, suggesting minimal or very uniform motion between the first and second data sets. In other words, if the comparison indicates that there is either no motion or very consistent motion across the datasets, the process of updating the X and Y coordinates for the search offset is discontinued, as the current offset is deemed adequate for the matching task.

In examples, the plurality of search offsets are applied in an order according to a predefined search pattern. The search pattern may for example comprise circular spiral pattern (starting at 0,0), elliptical spiral pattern (starting at 0,0) or raster order. Depending on the search pattern, different advantages may be achieved. For example, applying raster order may facilitate compatibility with hardware architectures. Some hardware architectures may be optimized for processing data in a raster order. Leveraging this natural data flow can result in faster processing times and lower computational overhead. Using a spiral pattern, starting the center (0,0), and gradually moving outward in a spiral pattern is often efficient because the best match is frequently located near the initial position, especially in cases of small movements. This approach quickly checks the most likely positions first, potentially reducing the number of comparisons needed to find the best match.

In examples, the method further comprises receiving a list of search offset displacements and an initial search offset, wherein the plurality of search offsets are applied in an order according to the list of search offset displacements, starting at the initial search offset. There are 8 valid steps which can be coded with 3 bits: (−1,−1); (−1,0); (−1,+1); (0,−1); (0,0) (not allowed); (0,+1); (1,−1); (1,0); (1,1). Putting the upper limit of search steps at 256 requires a table of 768 bits (96B). This may thus result in a configurable search pattern, which can be efficiently communicated to the processor.

In examples, the method further comprises, for each data item of the first data, using the search offset associated the data item to determine a motion vector between first data and second data for the data item. For example, for each pixel (or for a subset of pixels, depending on the properties of the search offsets), a motion vector may be achieved.

In a second aspect, there is provided a non-transitory computer-readable storage medium comprising a set of computer-readable instructions stored thereon which, when executed by at least one processor are arranged to cause the at least one processor to perform a block matching operation between first data and second data by: a) configuring a buffer in internal memory of the processor for storing summed area table, SAT, data; b) populating the buffer with initial SAT data based on a difference between at least an initial portion of the first data and second data; c) performing an iterative process, wherein each iteration of the iterative process comprises: c1) selecting a first portion in the first data and a corresponding second portion of the second data, wherein the selecting is performed using a sliding window approach, wherein a window used for selecting moves with a predefined window offset for each iteration; c2) determining a subset of the first portion and a subset of the second portion; c3) computing absolute differences, AD, data between the determined subset of the first portion and the determined subset of the second portion; c4) computing SAT data using the computed AD data and at least a portion of the SAT data stored in the buffer; c5) replacing a subset of the SAT data stored in the buffer with at least portions of the computed SAT data; c6) calculating difference data between the first portion and the second portion using the SAT data stored in the buffer, wherein the difference data comprises a difference result for each of a plurality of comparisons between the first data and the second data; and c7) storing the calculated difference data between the first portion and the second portion to memory; and d) using the stored difference data to determine matched blocks of data between the first data and second data.

The second aspect may generally have the same features and advantages as the first aspect.

In a third aspect, there is provided a processing module, configured to perform a block matching operation between first data and second data, the processor configured to: obtain task data describing a block matching task to be executed between first data and second data; configure a buffer in internal memory of the processor for storing summed area table, SAT, data; populate the buffer with initial SAT data based on a difference between at least an initial portion of the first data and second data; perform an iterative process, wherein each iteration of the iterative process comprises: select a first portion in the first data and a corresponding second portion of the second data using a sliding window approach, wherein a window used for selecting moves with a predefined window offset for each iteration; determine a subset of the first portion and a subset of the second portion; compute absolute differences, AD, data between the subset of the first portion and the determined subset of the second portion; compute SAT data using the computed AD data and at least a portion of the SAT data stored in the buffer; replace a subset of the SAT data stored in the buffer with at least portions of the computed SAT data; calculate difference data between the first portion and the second portion using the SAT data stored in the buffer, wherein the difference data comprises a difference result for each of a plurality of comparisons between the first data and the second data; and store the calculated difference data between the first portion and the second portion to internal memory; and using the stored difference data to determine matched blocks of data between the first data and second data.

The third aspect may generally have the same features and advantages as the first aspect.

In examples, there is provided a system configured to perform a block matching operation between a first data frame and second data frame, the system comprising a first processing module and a second processing module according the third aspect, wherein the first processing module is configured to: receive input data, the input data comprises the first data frame, the second data frame and a data size; dividing the first data frame into a plurality of first data according to the data size; dividing the second data frame into a plurality of second data according to the data size; and issue first task data describing a block matching task to be executed to the second processing module, the first task data identifying a first data among the plurality of first data, and a second data among the plurality of second data.

The system may for example be a system on a chip (SoC). The system comprises a host processor. The host processor may for example be a central processing unit (CPU). The system further comprises an offload processor such as a graphics processing unit (GPU), Neural Processing Unit (NPU), an Application-Specific Integrated Circuits (ASIC) or a Field-Programmable Gate Array (FPGA). The offload processor may for example comprise a neural engine (NE) (an example of the second processing module) which implements the block matching functionality as described above.

The first processing module may be referred to as Command Stream Frontend or Command processing unit (ref 640 in FIG. 5 below). The CSF may be the interface or implementation for task submission exposed by the host CPU to an offload processor. This includes the global interface, as well as command stream group and command stream interfaces. The first processing module is configured to receive input data, the input data comprises the first data frame, the second data frame and a data size. The input data may be received from a compiler. The first processing module subdivides the first and second data frames (e.g., image frames) into stripes (of compiler determined size, the data size) to achieve a plurality of first data and a plurality of second data.

The first processing module may thus be configured to issue first task data describing a task to be executed, the task being a block matching task to be executed, to the second processing module. The first task data identifies a first data among the plurality of first data, and a second data among the plurality of second data. The task data may be issued as part of a command stream. A command stream may comprise at least one command (task) in a given sequence.

Advantageously, a hardware arrangement for performing a block matching operation between a first data frame and second data frame may be achieved. This process is efficiently managed by dividing the task into multiple sub-tasks. These sub-tasks may be configured considering various factors like the available internal memory and processing capabilities of the offload processors within the hardware architecture. Dividing the block matching operation into smaller tasks allows for optimized use of the hardware resources, enhancing the overall efficiency and effectiveness of the block matching process.

In examples, the input data comprises a template block size, the template block size determining a size of the blocks of the first and second data frames used when performing the block matching algorithm, wherein the task data identifies the template block size. This example allows for further configuration possibilities which may be centrally orchestrated, e.g., determined by the compiler.

In examples, the system further comprises a third processing module according to the third aspect, wherein the first processing module is configured to: issue second task data describing a block matching task to be executed to the third processing module, the task data identifying a third data among the plurality of first data, and a fourth data among the plurality of second data. Advantageously, the system may comprise a second compute unit implementing the third processing module, for example a shader core of the GPU, which the first processing module uses to execute parts block matching operation. Advantageously, a block matching task of two image frames may be executed more efficiently, without requiring much communication and synchronization between the third and the fourth processing modules. The first processing module may thus dispatch processing of stripes to available processing modules according to the third aspect.

In examples, the system may further comprise a fourth processing module configured to execute a compute shader, wherein the host processor is configured to: issue third task data identifying motion vectors between the first data frame and the second data frame to the fourth processing module, the motion vectors derived from the difference (e.g., SAD or SSD) data stored by the second processing module (and optionally the third processing module) during the block matching operation.

The compute shader may use the motion vectors for various applications, especially in the field of image and video processing. Examples include for example optical flow applications for super resolution, where motion vectors aid in enhancing the quality of graphics animation and videos. In camera object tracking, motion vectors play a key role in identifying and following objects across different video frames. When it comes to depth from stereo images, motion vectors may be used to compare areas in stereo image pairs to estimate the depth of objects, creating a 3D perspective from 2D images. Motion vectors may also be used to analyze motion blur, and to reduce unwanted blur in images. Motion vectors may further be used for video compression, image warping, etc.

Computing Sum of Differences (SAD) Data

The present disclosure relates to block matching between first data and second data. In the below, the first and second data is exemplified as images, but any type of 2-dimensional data can be used.

Block matching involving two images using blocks of a certain size (e.g., 5×5) can be explained through a known process that involves Absolute Differences (AD), Summed Area Table (SAT), and Sum of Absolute Differences (SAD). As noted above, SAD may be replaced by SSD, however, in the below, SAD will be used by way of example. First, the images are divided into smaller 5×5 blocks. For each block in the first image, the algorithm searches for the most similar block in the second image.

To compare blocks, AD is calculated by taking the absolute difference between corresponding pixel values of a block from the first image and a block from the second image. However, directly calculating AD for each pixel in every possible 5×5 block across the images would be computationally intensive.

To reduce the complexity, SAT can be used. SAT is a technique used to quickly calculate the sum of values in a rectangular subset of a grid. By calculating a SAT from the AD data, it becomes much quicker to find the sum of pixel values for any 5×5 block within the image.

With SAT data available, the SAD for each block comparison can be efficiently computed. SAD is the sum of the absolute differences for each pixel in the block. It is a measure of similarity between two blocks—lower SAD values indicate more similar blocks. By comparing the SAD for a block in the first image with all possible (e.g., within a search window) 5×5 blocks in the second image, the algorithm identifies the block with the lowest SAD value as the best match.

This process is repeated for each 5×5 block in the first image, effectively matching blocks across the two images based on their SAD values, which are efficiently computed using the pre-calculated SAT data.

In the present disclosure, techniques to implement block matching in a hardware unit are described. The techniques described herein may significantly enhance efficiency of a hardware block matching engine (BME). The resulting BME may be compact yet capable of high throughput. Additionally, the BME may offer enhanced power efficiency compared to existing block matching technologies.

For example, AD for a comparison between an 8×8 area of a first image and a second image may look like this:

TABLE 1

|   | 0 | 1 | 2 | 3 | 4 | 5 | 6 | 7 |
|---|---|---|---|---|---|---|---|---|
| 0 | 53 | 37 | 40 | 32 | 8 | 10 | 45 | 100 |
| 1 | 53 | 29 | 43 | 20 | 14 | 5 | 17 | 71 |
| 2 | 40 | 35 | 9 | 6 | 11 | 3 | 12 | 83 |
| 3 | 105 | 39 | 7 | 23 | 29 | 29 | 10 | 58 |
| 4 | 52 | 42 | 24 | 48 | 54 | 54 | 2 | 85 |
| 5 | 18 | 25 | 44 | 5 | 1 | 34 | 88 | 106 |
| 6 | 11 | 49 | 59 | 45 | 57 | 46 | 37 | 10 |
| 7 | 100 | 97 | 100 | 103 | 17 | 35 | 50 | 76 |

Using table 1, SAT can be computed using two passes with 8 accumulators (see further below in conjunction with FIG. 5. After the first pass (summing left to right in table 1), the intermediate SAT will look like this:

TABLE 2

|   | 0 | 1 | 2 | 3 | 4 | 5 | 6 | 7 |
|---|---|---|---|---|---|---|---|---|
| 0 | 53 | 90 | 130 | 162 | 170 | 180 | 225 | 325 |
| 1 | 53 | 82 | 125 | 145 | 159 | 164 | 181 | 252 |
| 2 | 40 | 75 | 84 | 90 | 101 | 104 | 116 | 199 |
| 3 | 105 | 144 | 151 | 174 | 203 | 232 | 242 | 300 |
| 4 | 52 | 94 | 118 | 166 | 220 | 274 | 276 | 361 |
| 5 | 18 | 43 | 87 | 92 | 93 | 127 | 215 | 321 |
| 6 | 11 | 60 | 119 | 164 | 221 | 267 | 304 | 314 |
| 7 | 100 | 197 | 297 | 400 | 417 | 452 | 502 | 578 |

After the second pass, summing top to bottom, the final SAT will look like this:

TABLE 3

|   | 0 | 1 | 2 | 3 | 4 | 5 | 6 | 7 |
|---|---|---|---|---|---|---|---|---|
| 0 | 53 | 90 | 130 | 162 | 170 | 180 | 225 | 325 |
| 1 | 106 | 172 | 255 | 307 | 329 | 344 | 406 | 577 |
| 2 | 146 | 247 | 339 | 397 | 430 | 448 | 522 | 776 |
| 3 | 251 | 391 | 490 | 571 | 633 | 680 | 764 | 1076 |
| 4 | 303 | 485 | 608 | 737 | 853 | 954 | 1040 | 1437 |
| 5 | 321 | 528 | 695 | 829 | 946 | 1081 | 1255 | 1758 |
| 6 | 332 | 588 | 814 | 993 | 1167 | 1348 | 1559 | 2072 |
| 7 | 432 | 785 | 1111 | 1393 | 1584 | 1800 | 2061 | 2650 |

Using the SAT, SAD value for a block of any size may be determined. For example, SAD for a block defined by the top-left corner (x1, y1) and the bottom-right corner (x2, y2) (in this example having a size 3×3, at top left position x=2, y=4) is calculated as:

SAD=SAT(x2,y2)−SAT(x2,y1−1)−SAT(x1−1,y2)+SAT(x1−1,y1−1)

SAD=SAT(4,6)−SAT(4,3)−SAT(1,6)+SAT(1,3)

SAD=1167−633−588+391=>

SAD=337                                                                 Equation 1

As understood from above, for comparisons between larger areas of a first image and a second image, and/or for larger differences between the first image and the second image, the values in the SAT table may get substantial. In one example, a maximum size of each SAT data item (e.g., cell) is T bits. If the value overflow, the size of the SAD value involving the overflow value will be negative. The problem with overflow can be mitigated by adding $2^T-1$ to the negative SAD result.

As can be noted from above, during the calculation of SAD data for a particular subset (above, a 3×3 sized subset at top left position x=2, y=4) of the search (first image) and template (second image) data, there is a considerable overlap in the calculations required for adjacent subsets. To leverage this overlap, SAT data can be stored in a buffer throughout the block matching operation between the search and template data, as now will be described in conjunction with FIG. 1.

In FIG. 1, SAT processing by a SAD unit (which will be further described below in conjunction with FIG. 4) for a 9×9 block size (also referred to as a template block size) is described. For a 9×9 template, a 12×12 SAT is needed to generate a 4×4 SAD. The size of the SAT depends on the template block size dimensions. For example, 5×5 template requires a 9×9 SAT. Calculating a SAD thus depend on the size of the template block size. An additional SAT column is initialized to 0—which corresponds to the left-most column.

SAT data will continuously be stored in a buffer, partially managed as a circular buffer such that buffered SAT data are continuously replaced during the SAT processing.

Initially, the buffer is populated with initial SAT data, in FIG. 1, 13×12 SAT data 202. The SAT data is based on a difference between at least an initial portion of the first image and second image. Specifically, initial AD data between initial portion of the first image and the initial portion of the second image is computed. In FIG. 1, the initial portion of the first image and the second image has the size 12×12. From the initial AD data, the initial SAT data is computed using the initial AD data, and at least parts of the initial SAT data 202 is stored in the buffer. From the initial SAT data 202, the first 16 (4×4 block) SAD data 204 is computed. Each block of SAD data thus comprises SAD result for each of 16 comparisons between the first image and the second image, according to the template block size, which is 9×9. As discussed above, the used SAT data for determining a SAD value is calculated according to Equation 1.

After the buffer have been populated with at least parts of the initial SAT data 202, and iterative process is performed, using a sliding window approach for selecting the portions of the first image and the second image to compute SAD data from. For the first iteration, the sliding window is moved with a predefined window offset of 4 (in a vertical direction).

As can be seen in FIG. 1, for the initial SAD data 204, a 12×12 SAT is needed to be computed from scratch. However, for the next 4×4 SAD (referred to as '1' in 208), only a 12×4 sized SAT (blocks '9', '10', '11') is required to be computed. The other portions (blocks '3', '4', '5', '6', '7', '8') of the SAT 206 are taken from the SAT buffer. Since the new 12×4 SAT is following on the previously buffered SAT, only a subset of the portions of the first and second image determined by the sliding window approach are needed to be processed to compute the AD data required to extend the SAT "downwards" with the 12×4 sized SAT (blocks '9', '10', '11'). The subset of the portions of the of the first and second image may have the size 12×4 and thus correspond the data not previously used to determine SAT data.

The iterative process continues until 7 4×4 SAD data 210 has been computed. The iterative process then continues to move to the right in the first and second image, to select e.g., portion starting at (0,3). The SAT is extended right by 4 columns (column 12-15) using e.g., the saved SAT entries from column 11, along with the newly computed AD data. Three vertical blocks of SAT data ('30', '31', '32') are needed to be computed to determine the next 4×4 block of SAD data ('8'). The other portions (blocks '1', '2', '4', '5', '7', '8') of the SAT 214 are taken from the SAT buffer. For the following iterations, only a single block of SAT data (e.g., '33') is required to be computed to calculate a new SAD block (e.g., '9'). In other words, for each iteration (except in the left column and the top of each column as described above), a new 4×4 of AD is computed to generate another 4×4 of SAT data and to compute another 4×4 of SAD values. This may be done at a rate of one 4×4 per cycle to average 16 SAD results per cycle (except in the left column and the top of each column). It should be noted that in other implementations, a different number of SAD results per iteration may be computed, such as 9 (3×3) or 25 (5×5) or any other suitable number and block size.

As can be seen in FIG. 1, the SAT data required to calculate each new 4×4 SAD data is not all previously calculated SAT data. For example, for the second SAD block ('1'), the first three rows in the initial SAT 202 are not required. Moreover, when the next column of blocks of SAT data is calculated (i.e., blocks '30', '31' and '32' in 214), the leftmost 4 columns of SAT data 212 are not needed to be stored in the buffer. Consequently, for each iteration, a subset of the SAT data stored in the buffer can be replaced with at least portions of the SAT data computed in that iteration.

Figure 2:
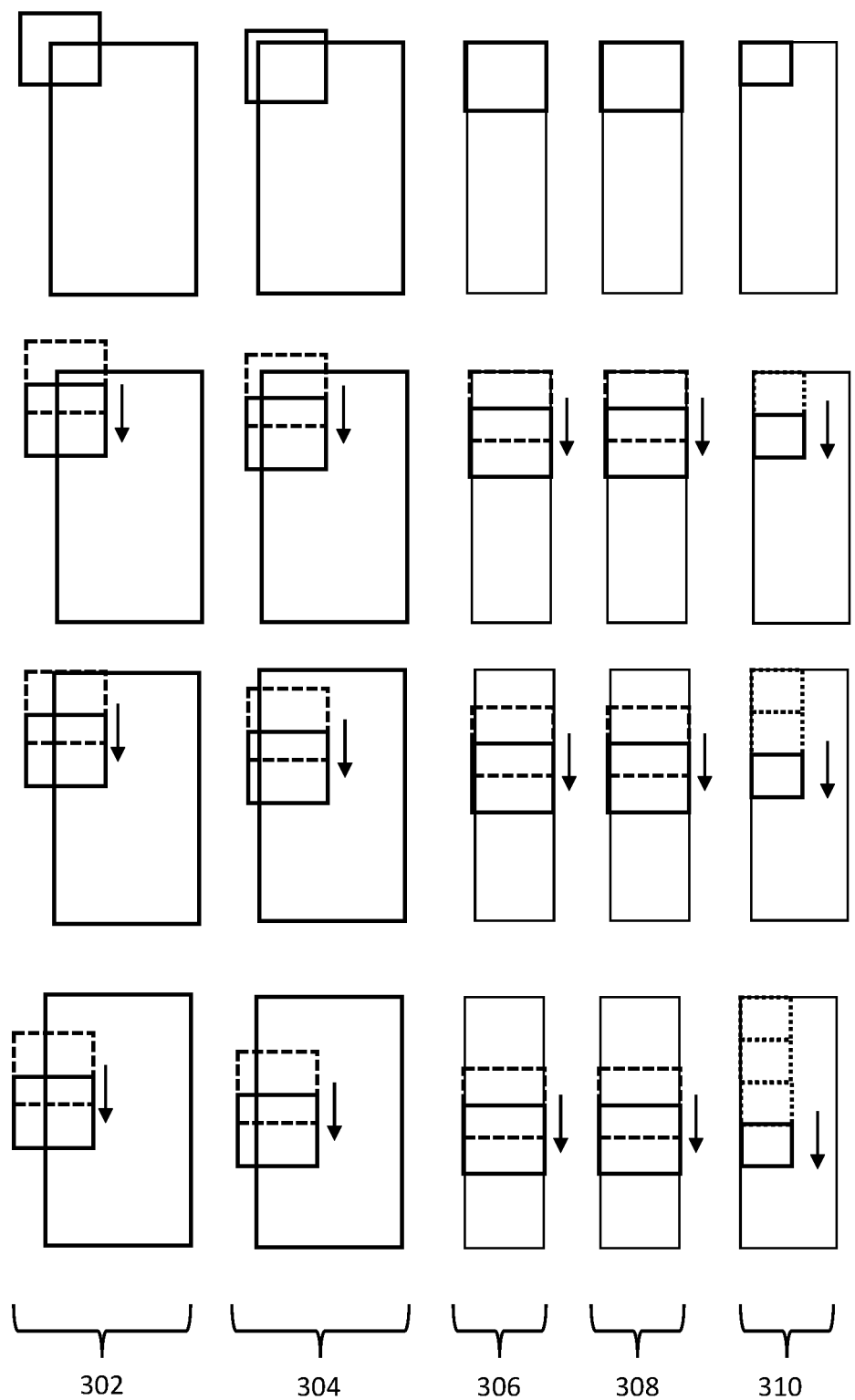
FIG. 2 illustrates traversal in data in a search frame and a template frame to achieve sum of absolute differences data according to embodiments.

FIG. 2 schematically shows the iterative sliding window process used to determine a new block of SAD data 310. Each row in FIG. 2 represents an iteration. The columns, from left to right, represent: the first image (or search frame) 302, the second image (or template frame) 304, the AD data 306, the SAT data 308 and the SAD data 310. Solid line squares in columns 302 304, 306, 308 indicate the portion of the respective data used in an iteration to create a new block of SAD data (indicated by the solid line square in column 310). Dashed squares in columns 302 304, 306, 308 indicate the portion of the respective data used in a previous iteration to create a previous block of SAD data (indicated by the dashed square in column 310). As can be seen in FIG. 2, there is a corresponding overlap between the solid line square and the dashed square in each of the first image (or search frame) 302, the second image (or template frame) 304, the AD data 306, and the SAT data 308. As such, it may be advantageous to buffer at least a part of the calculated SAT for each iteration, to be used in the following iteration(s). Consequently, only a fraction of the calculations needed to determine a SAD data block of the SAD data 310 in a later iteration is needed, since the SAT data from previous iteration(s) are available in the buffer. All redundant calculations for determining a SAD data block may thus be eliminated.

Offsetting the Template Frame

In some examples, block matching is executed by dynamically shifting the template frame 304 across a predefined search region of the search frame 302. Consider a search region with dimensions of 15×15 pixels as an example. In this context, the objective is to identify the most suitable match for each block located within the search image inside the corresponding search region of the template frame. To illustrate, take a 5×5 pixel block situated at coordinates (10, 10) in the search frame. The block matching procedure of this example includes locating an optimally matching block of identical dimensions (5×5) within the template frame. The search for this congruent block is confined within a specific area, determined by the block's initial position in the search frame in conjunction with the dimensions of the designated search area. Hence, in this scenario, the matching block would be sought within a region extending from X=3 to X=18 and Y=3 to Y=18 in the template frame.

Figure 3:
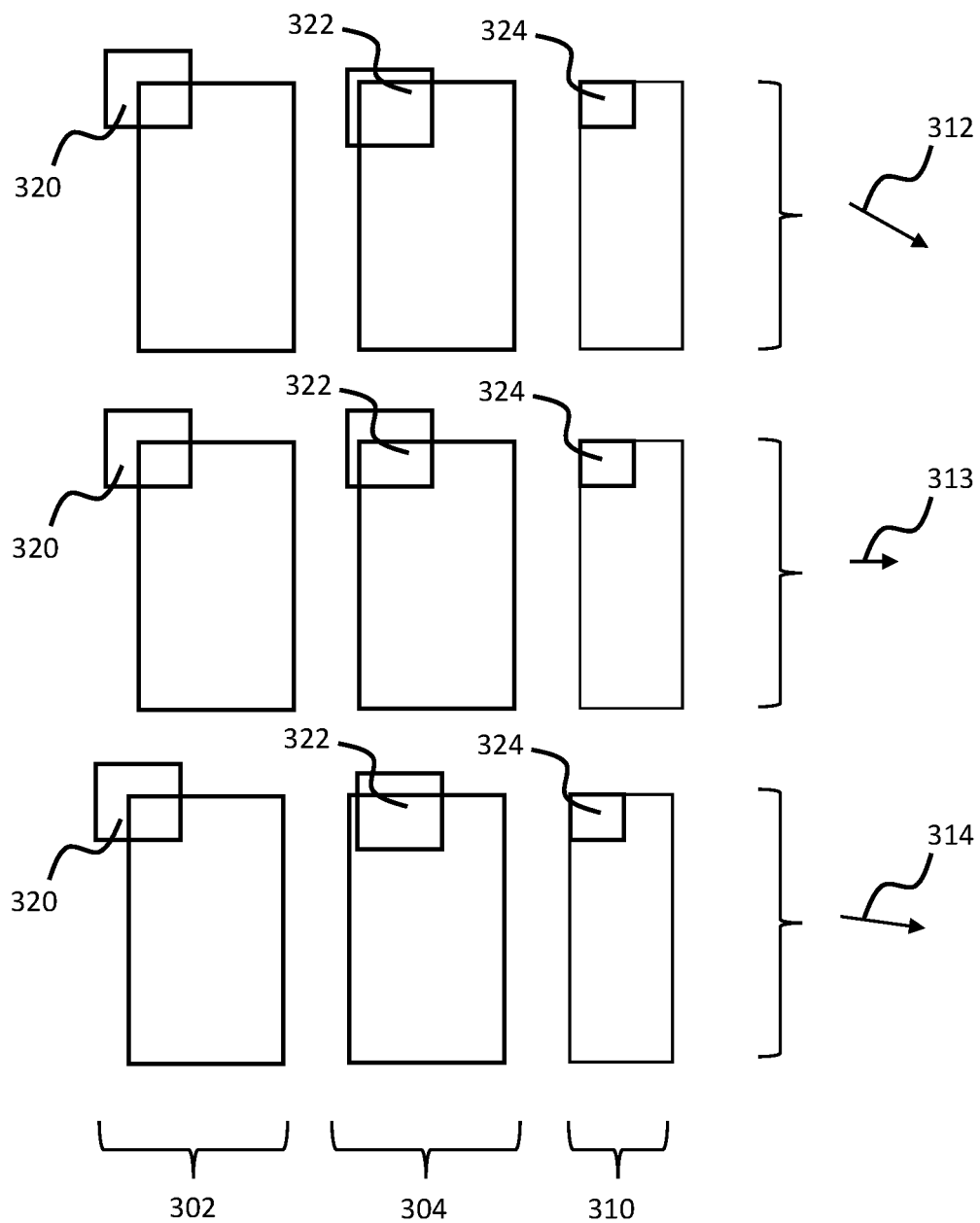
FIG. 3 illustrates computing of motion vectors for a portion of a search frame as compared to a template frame.
Figure 3:
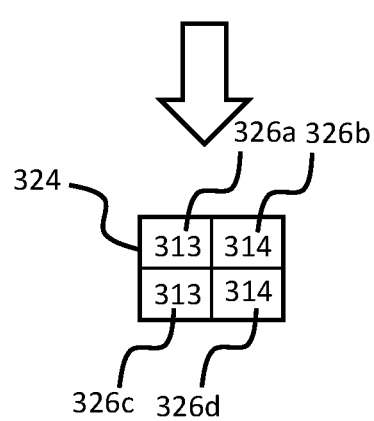

FIG. 3 shows by way of example block matching where the template frame is offset using a plurality of search offsets. In the example of FIG. 3, only three search offsets are shown, for ease of description. FIG. 3 shows block matching for a portion 320 of the first image 302, using a corresponding second portion 322 of the second image 304 to achieve SAD results 324 in the SAD data 310. The corresponding second portion 322 of the second image 304 is selected according to the search offset and is thus different for each search offset.

In FIG. 3, the SAD results 324 for the comparisons comprises a SAD result 326a-d for each of a plurality of comparisons between the portions 320, 322 of the first image 302 and the second image 304. In the example, for ease of description, the SAD results 324 comprises 4 separate SAD results 326a-d, one for each comparison. Each SAD result 326a-d is associated with a data item of a plurality of data items in the first image 302, for example pixels or groups of pixels. The block matching method may then, for each data item of the plurality of data items, upon determining that the SAD result 326a-d calculated for the data item is lower than the SAD result(s) calculated for all previous offsets for that data item, associating the search offset with the data item. This is shown in FIG. 3, using the references for each SAD result 326a-d. The two leftmost SAD results 326a, 326c refers to the middle offset 313 in FIG. 3, while the two rightmost SAD results 326b, 326d refers to the lower offset 314 in FIG. 3. The offsets may be used to determine a motion vector between first image 302 and second image 304 for the data item.

In some embodiments, upon determining that at least a threshold number of SAD results in the SAD data calculated for the search offset is below a threshold value, the method may be aborted. The currently search offsets associated with the data items of the first image may then be used to determine matched blocks of data between the first image and second image. For example, if a predetermined ratio of SAD results determined for a search offset results in a SAD below the threshold value, it may be determined that good enough match have been between the first image and the second image have been found. For example, the threshold value may be 0, or any other SAD which is deemed good enough. The threshold number typically depends on the number of SAD results that are determined during the iterative process for a search offset, but it may for example correspond to a ratio of 10%, 20%, 50%, etc.

The search offsets may be applied to the template image (second image) in a predetermined order, according to a predefined search pattern. The search pattern may be any of the following: a spiral circular pattern, a spiral elliptical pattern, and a raster order pattern. In the embodiment where early abortion of the offsetting of the template image is possible, the order of the search offsets may be advantageous to save resources.

The search offsets may be determined by a list of search offset displacements and an initial search offset, wherein the plurality of search offsets are applied in an order according to the list of search offset displacements, starting at the initial search offset.

To minimize arithmetic and to allow e.g. 4 SADs/cycle with a minimum of logic, it may be advantageous to process a larger first 302 and second 304 image at once as possible, since, as shown in FIG. 1, for each iteration (except in the left column and the top of each column as described above), a new 4×4 of AD is computed to generate another 4×4 of SAT data and to compute another 4×4 of SAD values. A balance between the available internal memory (for storing the search image and the template image, the SAT buffer, and the best offsets) and the desired throughput are needed. Larger internal memory facilitates larger first and second images, which in turn results in a higher throughput. Examples of internal memory described herein includes storage 738 as described below in conjunction with FIG. 6, as well as local cache 656a, 656b in FIG. 5.

Hardware Implementation

Figure 4:
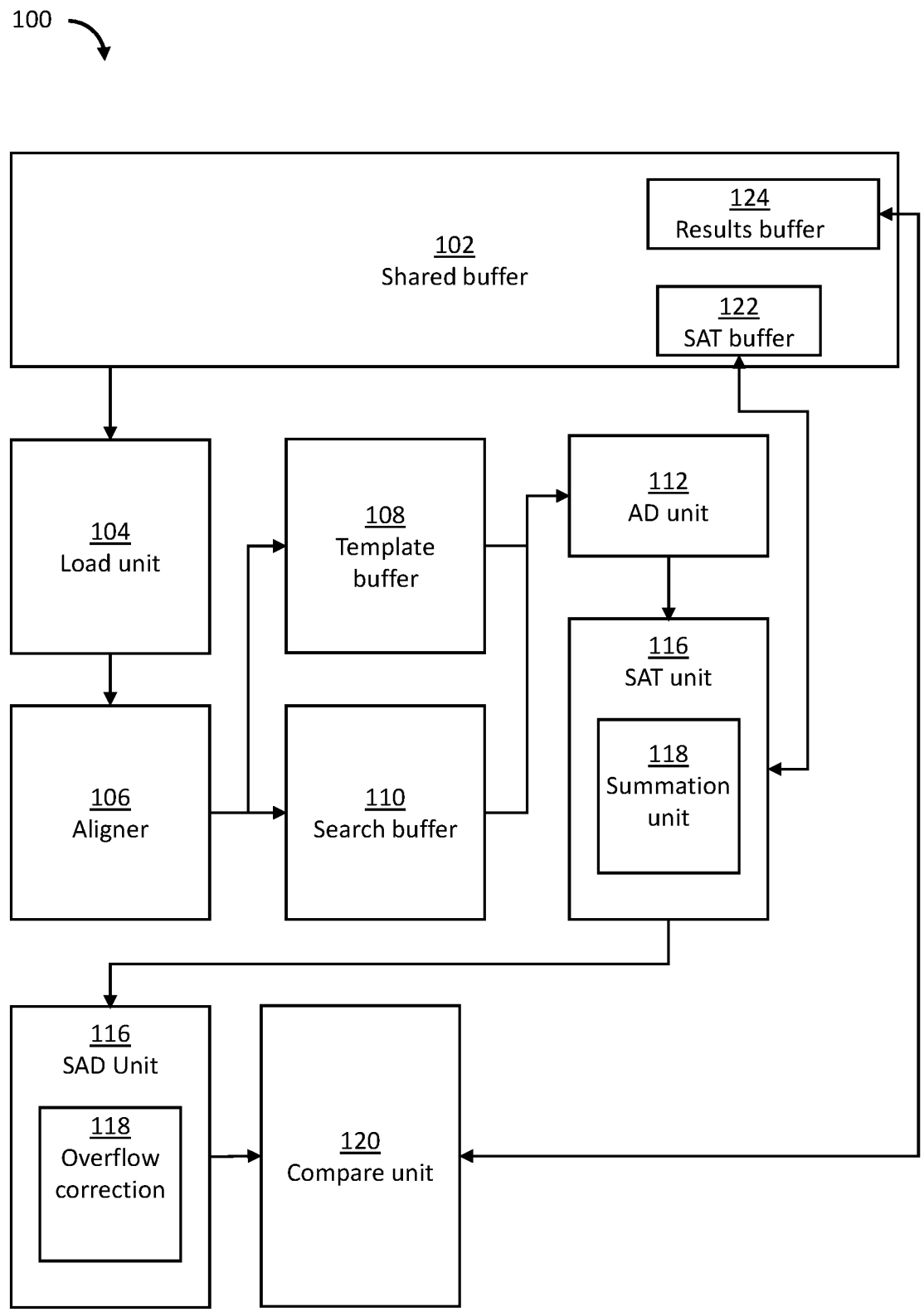
FIG. 4 illustrates schematically an architecture of a block matching engine according to embodiments.

FIG. 4 shows by way of example a hardware implementation of a block matching engine (BME) 100.

The BME 100 comprises a shared buffer 102, which comprises a plurality of memory banks. The shared buffer is connected to the units of the BME and used to pass data between the units. The shared buffer 102 contains input data (not shown), i.e., the first image and the second image. The first image and the second image are typically parts of a larger first and second image frame, i.e., a×Y region of frame 1 in a video sequence, and the corresponding region in frame 0. For example, the first image and the second image may be stripes of the first and second image frame. The processor implementing the BME 100 comprises a direct memory access (DMA) unit for loading the input data into the shared buffer. The BME 100 is configured to determine matched blocks between the first and second image, for example for the purpose of determining motion vectors for the first image as compared to the second image.

The BME 100 further comprises a load unit 104. The load unit 104 loads a portion of the first data and a corresponding portion of the second data. The loaded portions will be used and be processed in the current iteration of the iterative process discussed herein.

Typically, the loaded portions may be a multiple of "bricks" of the input data, 4 wide and 8 high. Advantageously, this may facilitate efficient read and write to the shared buffer. The portions of the first and/or second image needed to be loaded for the current iteration may typically be unaligned with brick boundaries. Consequently, the loaded portions need to be aligned according to the current search offset, which is handled by the aligner 106. The aligner 106 comprises a horizontal aligner and a vertical aligner.

The loaded and aligned portions are stored in a template buffer 108 and a search buffer 110. For each iteration (e.g., where the window is moved with a predefined offset, such as 4 in a vertical direct), data from the template buffer 108 and search buffer 110 may be used (if the data in these buffers are enough for the iteration at hand) or new bricks are loaded from the shared buffer 102. Using the above strategy, read and write to the shared buffer is kept low, and an efficient block matching procedure may be accomplished.

The BME 100 comprises an AD unit 112. The AD unit 112 is configured to calculate absolute differences (AD) data between the currently processed portions of the first and second image, as deemed necessary. As mentioned above, the inherent overlapping of image data used in iterations of the iterative process means that not all data in the currently processed portions of the first and second image is required to be analysed for differences, since some data may already have been analysed in previous iterations. The AD unit computes AD data between the necessary subsets of the first portion and the necessary subset of the second portion. This may be accomplished, for example, by determining a subset of the first portion and a subset of the second portion not previously processed/selected during the iterative process.

The AD data is fed into a SAT unit 116. The SAT unit 116 comprises a summation unit 118 configured to calculate a sum of two or more numbers to produce SAT data. The SAT unit is connected to a SAT buffer 122, used to store SAT data as described herein. The SAT unit reads and writes to the SAT buffer 122. For example, the SAT unit 116 may for each iteration replace a subset of the SAT data stored in the SAT buffer 122 with at least portions of SAT data computed in the current iteration.

The SAT data loaded and computed by the SAT unit is fed to a SAD unit 116, with overflow correction logic (as described above) implemented in an overflow correction unit 118. The SAD unit determine SAD data for result for each of a plurality of comparisons between portions of the input data currently processed in the current iteration of the iterative process.

The SAD data computed by the SAD unit 116 is fed into a compare unit 120 which is connected to a result buffer 124 in the shared buffer 102. The result buffer 124 stores the currently best offset for each data item (e.g., pixel, group of pixels) and its corresponding SAD result of the first image inputted to the BME 100. The compare unit 120 compares the currently calculated SAD results with the SAD results stored in the result buffer 124, and if a SAD result of a data item for a current search offset is lower than the stored SAD result for that data item, the compare unit 120 updates the data stored in the result buffer 124 accordingly.

It should be noted that in some embodiments, not shown in FIG. 4, all SAD results for each search offsets are stored as a 3D volume of SAD results (width*height*search window size), which is then processed using e.g., a neural network to find the motion vectors between the input images.

Figure 5:
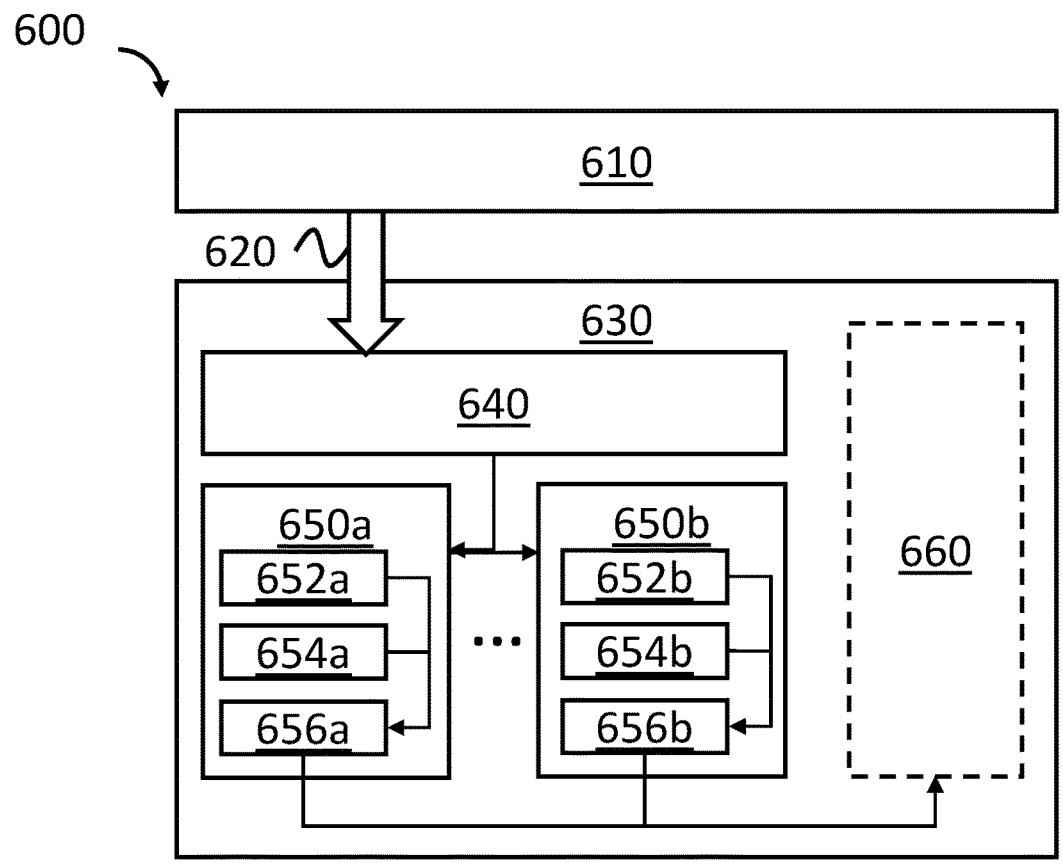
FIG. 5 illustrates schematically an example of a data processing system according to embodiments.

In FIG. 5, a system 600 is shown. A processor 630 is arranged to receive a command stream 620 from a host processor 610, such as a central processing unit (CPU). The command stream comprises at least one command in a given sequence, each command to be executed, and each command may be decomposed into a number of tasks, such as block matching tasks discussed in this document.

The scheduling of the tasks may be implemented by a command processing unit 640 (also referred to as first processing module herein). The command stream 620 is thus sent by the host processor 610 and is received by the command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650a, 650b each of which are configured to process at least one of the plurality of tasks. Each of the compute units 650a, 650b may comprise a BME 100 as discussed herein.

The command processing unit 640 may for example be configured to receive input data, the input data comprises the first data frame, the second data frame and a data size. For example, in a given video sequence, the term 'first data frame' refers to a particular image frame, which could be any frame within the sequence. The 'second data frame' may be the image frame that directly precedes this first data frame in the same video sequence. The goal of using these two frames may be to calculate motion vectors that represent the movement or changes from the second frame to the first frame. These motion vectors can be used for various applications such as compressing the video (to reduce file size or improve streaming quality) and image warping (altering the shape or structure of objects within the frame for effects or corrections). The command processing unit 640 may divide the first data frame into a plurality of first data according to the data size and divide the second data frame into a plurality of second data according to the data size. The data size may be configured according to available computational power of offload processor(s) that will perform the block matching, available memory of such offload processor(s), as well as a desired throughput. The command processing unit 640 610 may then issue a plurality of task data, each task data describing a block matching task to be executed to a second processing module (e.g., processing modules 652a, 652b, 654a, 654b below), each task data identifying a first data among the plurality of first data, and a second data among the plurality of second data.

The processor 630 (also referred to as an offload processor) may comprises one or more compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least processing module 652a, 652b for executing tasks of a first task type, and processing module 654a, 654b for executing tasks of a second task type, different from the first task type. In some examples, the processing module 652a, 652b may be a processing module for processing neural processing operations. In these cases, the processing module 652a, 652b is for example a neural engine. Similarly, the processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the processing module 652a, 652b of a given compute unit 650a, 650b, and tasks of a second task type to the processing module 654a, 654b of a given compute unit 650a, 650b. The command processing unit 640 would issue machine learning/neural processing tasks (such as block matching) to the processing module 652a, 652b of a given compute unit 650a, 650b where the processing module 652a, 652b is optimized to process neural network processing tasks, for example by comprising an efficient means of handling a large number of multiply-accumulate operations. Similarly, the command processing unit 640 would issue graphics processing tasks to the processing module 654a, 654b of a given compute unit 650a, 650b where the processing module 652a, 654a is optimized to process such graphics processing tasks. Examples of such graphics processing tasks include using a compute shader, wherein the task data sent to the second processing module 652a, 654a identifies motion vectors between the first data frame and the second data frame as discussed herein. The compute shader may for example perform image warping, optical flow applications for super resolution, reduction of unwanted motion blur in images, etc.

In addition to comprising a processing module 652a, 652b and a processing module 654a, 654b, each compute unit 650a, 650b also comprises a memory in the form of a local cache 656a, 656b (such as the shared buffer 100 in FIG. 4) for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples, it may be necessary to provide access data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656b such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM@Advanced Microcontroller Bus Architecture (AMBA®) interface, such as the Advanced eXtensible Interface (AXI), may be used.

Figure 6:
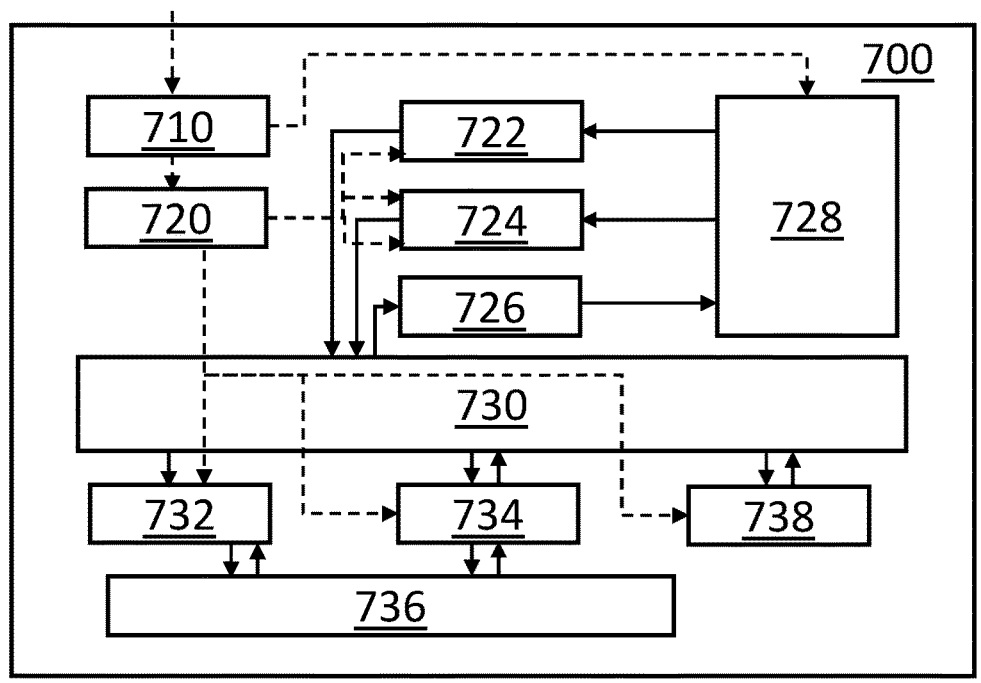
FIG. 6 illustrates a schematic diagram of a neural engine according to embodiments.

FIG. 6 is a schematic diagram of a neural engine 700, which in this example is used as a first processing module 652a, 652b in a data processing system 600 in accordance with FIG. 5. The neural engine 700 includes a command and control module 710. The command and control module 710 receives tasks from the command processing unit 640 (shown in FIG. 5), and also acts as an interface to storage external to the neural engine 700 (such as a local cache 656a, 656b and/or a L2 cache 660) which is arranged to store data to be processed by the neural engine 700 such as data representing a tensor, or data representing a stripe of a tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of the first and second image frames which is to be operated upon in accordance with the block matching process described herein.

In this example, the handling unit 720 implements the iterative process of the method of block matching as described herein. The TSU subdivides the stripe (e.g., of the two image as discussed above) into blocks and, for each block, the input tensor data is written to the shared buffer, i.e., the portions of the two images needed to process the block.

After the inputs have been loaded into the shared buffer and space to write the output exists in the shared buffer, it initiates processing of the block using the block matching engine (100 in FIG. 4).

The handling unit 720 may obtains, from storage external to the neural engine 700 such as the L2 cache 660, the task data defining the block matching task.

The handling unit 720 coordinates the interaction of internal components (also referred to as execution units herein) of the neural engine 700. The internal components in combination implements the BME 100. The internal components include for example a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be the shared buffer, in that various functional units of the neural engine 700 share access to the storage 738.

The weight fetch unit 722 may fetch weights associated with the neural network from external storage and stores the weights in the storage 738. The input reader 724 may reads data to be processed by the neural engine 700 (e.g., by the BME) from external storage, such as a block of data representing parts of images used for block matching. The output writer 726 writes data obtained after processing by the neural engine 700 to external storage. The weight fetch unit 722, input reader 724 and output writer 726 interface with the external storage (which is for example the local cache 656a, 656b, which may be a L1 cache such as a load/store cache) via the DMA unit 728.

Data is processed by the neural engine 700 to generate output data corresponding to an operation, for example a block matching task. The result of each operation is stored in a specific pipe within the neural engine 700. The DPU array 730 is arranged to perform one or more operations associated with a dot product operation between two operands, such as between an array of weights and a corresponding block of data (e.g., representing part of a tensor). The vector engine 732 is arranged to perform elementwise operations, for example to apply scale parameters to scale an output of a dot product calculated by the DPU array 730. Data generated during the course of the processing of a task may be transmitted for temporary stage in the accumulator buffer 736, from where it may be retrieved by either the DPU array 730 or the vector engine 732 (or another different execution unit) for further processing as desired.

The transform unit 734 is arranged to perform in-block transforms such as dimension broadcasts or axis swaps. The transform unit 734 obtains data from a pipe, such as storage 738 (e.g., after processing by the DPU array 730 and/or vector engine 732) and writes transformed data back to the storage 738.

To make efficient use of the storage 738 available within the neural engine 700, the handling unit 720 determines an available portion of the storage 738, which is available during execution of part of a first task (e.g., during processing of a blocks of data associated with the first task by the BME). The handling unit 720 determines a mapping between at least one logical address associated with data generated during execution of a second task (e.g., by processing of a block of data associated with the second task by the DPU array 730, vector engine 732 and/or transform unit 734) and at least one physical address of the storage 738 corresponding to the available portion. The logical address is for example a global address in a global coordinate system. Hence, by altering the physical address corresponding to a given logical address, the handling unit 720 can effectively control usage of the storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein.

All storage in the neural engine 700 may be mapped to corresponding pipes, including look-up tables, accumulators, etc. If the neural engine supports 2 look-up tables (LUTs), then a maximum of 2 pipes could be used to target the LUTs to avoid needing to thrash the LUT storage; LUT pipes might then be single buffered. All other pipes could be mapped to a common Shared Buffer (or portions thereof) with fewer restrictions. Width and height of pipe can also be programmable, resulting a highly configurable mapping between pipes and storage elements within the neural engine 700.

Figure 7:
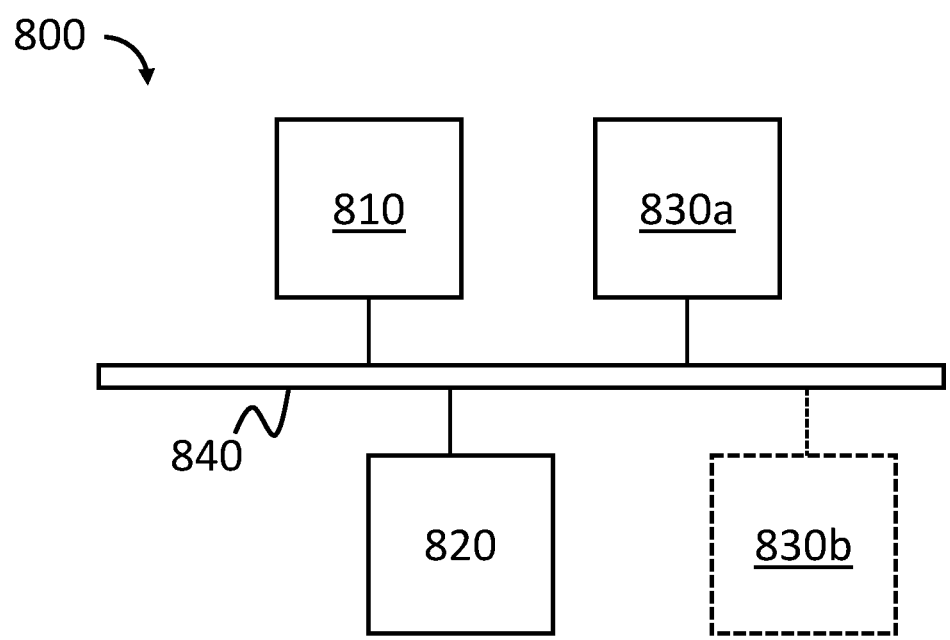
FIG. 7 illustrates schematically an example system for allocating handling of data according to embodiments.

FIG. 7 shows schematically a system 800 for allocating handling of data, and in some examples generating a plurality of blocks of input data for processing.

The system 800 comprises host processor 810, which may be similar to or the same as the processor 610 of FIG. 5, such as a central processing unit, or any other type of general processing unit. The host processor 810 issues a command stream comprising a plurality of commands, each having at least one task (e.g., a block matching task) associated therewith.

The system 800 also comprises a processor 830, which may be similar to or the same as the processor 630 of FIG. 1b, and may comprise at least some of the components of and/or be configured to perform the methods described herein. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM@Advanced Microcontroller Bus Architecture (AMBA®) interface, such as the Advanced eXtensible Interface (AXI), may be used.

Figure 8:
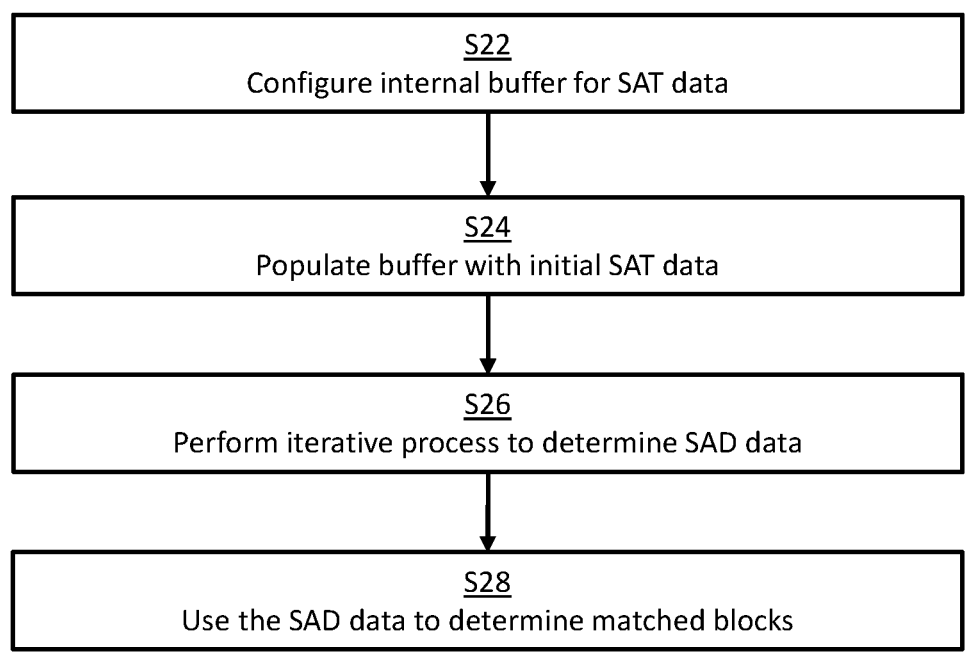
FIGS. 8-10 show flow charts of methods for block matching according to embodiments.
Figure 9:
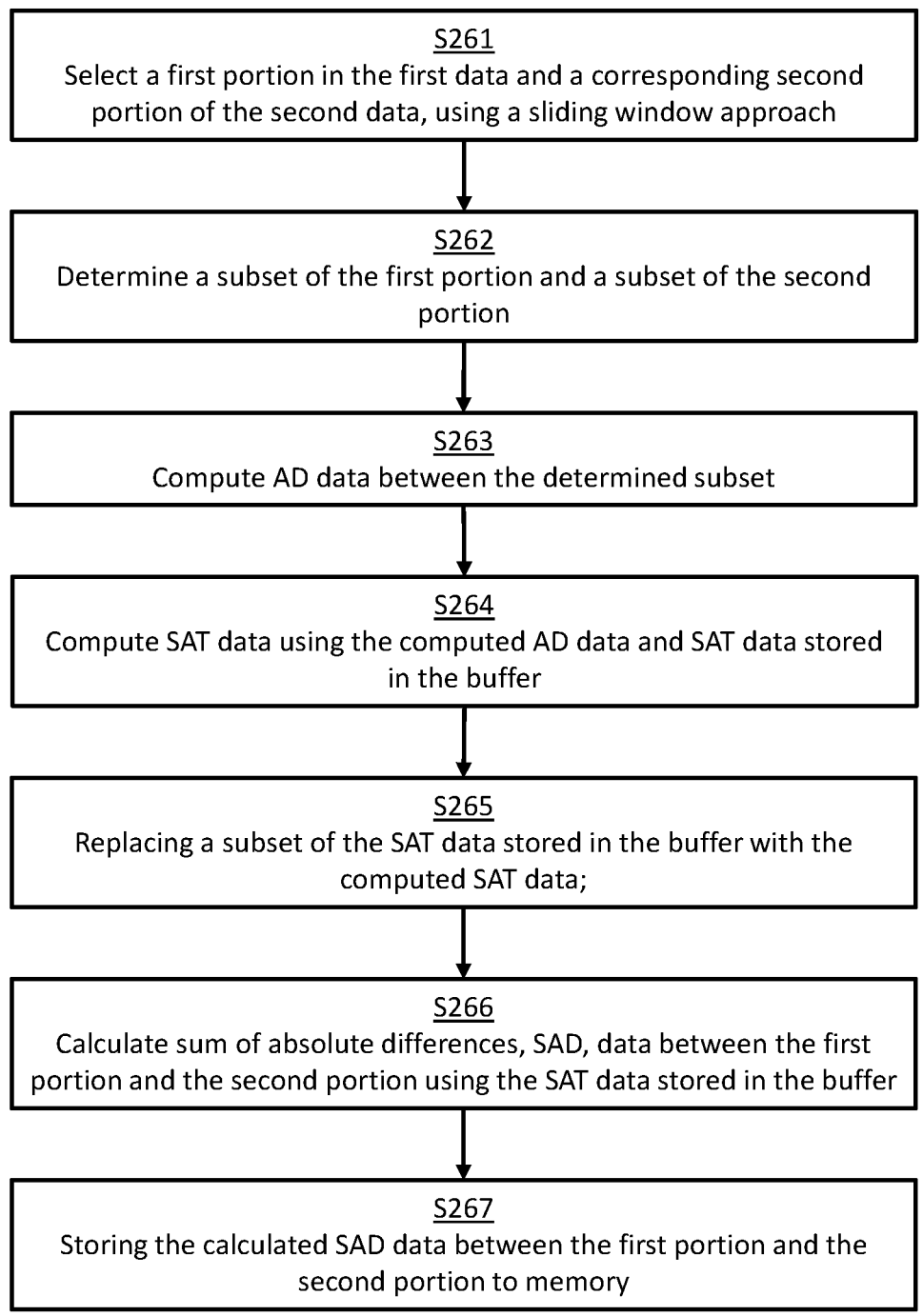
Figure 10:
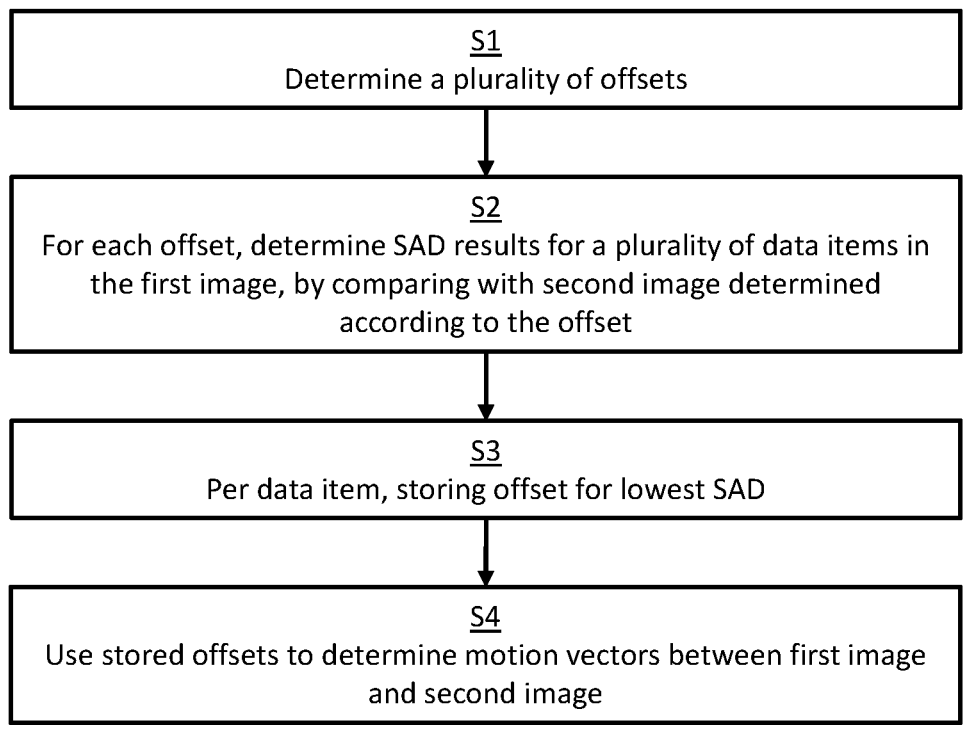

FIGS. 8-10 show flow charts of methods for block matching as described in herein.

FIG. 8 gives an overview of a method S2 performed by a processor between first data and second data. The method S2 comprises four steps:

Configuring S22 a buffer in internal memory of the processor for storing summed area table, SAT, data.

Populating S24 the buffer with initial SAT data based on a difference between at least an initial portion of the first data and second data.

Performing S26 an iterative process to determine, and store, SAD data. The iterative process continuously updates the buffer with SAT data.

Using S28 the determined, and stored, SAD data to determine matched blocks of data between the first data and second data.

FIG. 9 shows by way of example details of the step of performing S26 an iterative process to determine, and store, SAD data from FIG. 8.

The method S26 comprises the following steps:

Selecting S261 a first portion of the first data and a corresponding second portion of the second data, wherein the selecting is performed using a sliding window approach, wherein a window used for selecting moves with a predefined window offset for each iteration.

Determining S262 a subset of the first portion and a subset of the second portion.

Computing S263 AD data between the determined subset of the first portion and the determined subset of the second portion.

Computing S264 SAT data using the computed AD data and at least a portion of the SAT data stored in the buffer.

Replacing S265 a subset of the SAT data stored in the buffer with at least portions of the computed SAT data.

Calculating S266 sum of absolute differences, SAD, data between the first portion and the second portion using the SAT data stored in the buffer, wherein the SAD data comprises a SAD result for each of a plurality of comparisons between the first data and the second data.

Storing S267 the calculated SAD data between the first portion and the second portion to memory.

FIG. 10 shows by way of example a method including the method S2 of FIG. 8, for determining motion vectors between a first image frame and a second image frame.

The method comprises:

Determining S1 a plurality of search offsets.

For each search offset, determining S2 SAD results for a plurality of data items in the first image. The determining S2 comprises, for each iteration, selecting a first portion of the first image and a corresponding second portion of the second image, wherein the corresponding second portion of the second image is selected according to the search offset.

For each data item of the plurality of data items, upon determining that the SAD result calculated for the data item is lower than the SAD result(s) calculated for all previous offsets for that data item, associating the search offset with the data item and storing S3 the search offset.

For each data item of the first data, using S4 the search offset associated the data item to determine a motion vector between first data and second data for the data item.

Miscellaneous

In summary, in the present disclosure, a processor, method and non-transitory computer-readable storage medium for performing a block matching between first data and second data are provided. The block matching is performed using an iterative process, wherein, for each iteration, a portion of the first data and a corresponding portion of the second data is selected using a sliding window approach. When sum of absolute differences, SAD, data. Used for block matching, is calculated for a specific subset of first and second data, many of the calculations overlap with those needed for a nearby subset. Summed area table, SAT, data used for determining the SAD data is continuously stored and updated in a buffer, such that overlapping computations can be avoided.

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

Example Clauses

A: A method for block matching performed by a processor between first data and second data, the method comprising the steps of:

a) configuring a buffer in internal memory of the processor for storing summed area table, SAT, data;

b) populating the buffer with initial SAT data based on a difference between at least an initial portion of the first data and second data;

c) performing an iterative process, wherein each iteration of the iterative process comprises:

c1) selecting a first portion of the first data and a corresponding second portion of the second data, wherein the selecting is performed using a sliding window approach, wherein a window used for selecting moves with a predefined window offset for each iteration;

c2) determining a subset of the first portion and a subset of the second portion;

c3) computing absolute differences, AD, data between the determined subset of the first portion and the determined subset of the second portion;

c4) computing SAT data using the computed AD data and at least a portion of the SAT data stored in the buffer;

c5) replacing a subset of the SAT data stored in the buffer with at least portions of the computed SAT data;

c6) calculating difference data between the first portion and the second portion using the SAT data stored in the buffer, wherein the difference data comprises a difference result for each of a plurality of comparisons between the first data and the second data; and c7) storing the calculated difference data between the first portion and the second portion to memory; and d) using the stored difference data to determine matched blocks of data between the first data and second data.

B: The method of clause A, wherein the step b) comprises:
b1) computing initial AD data between initial portion of the first data and the initial portion of the second data;
b2) computing the initial SAT data using the computed initial AD data;
b3) storing the initial SAT data in the buffer.

C: The method of any one of clause A-B, further comprising:
defining a template block size;
wherein the step c6) is performed according to the template block size.

D: The method of clause C, wherein the difference data calculated during an iteration of the iterative process comprises 16 difference results.

E: The method of any one of clause A-D, wherein step c2) comprises:
determining a subset of the first portion and a subset of the second portion not previously selected during the iterative process;

F: The method of any one of clause A-E, wherein a maximum size of each SAT data item is T bits, where the step of calculating difference data between the first portion and the second portion comprises, upon determining that a difference result for a comparison between the first portion and the second portion has a negative size, adding $2^{T-1}$ to the difference result.

G: The method of clause F, wherein T=16.

H: The method of any one of clause A-G, wherein the first data comprises a plurality of data items, wherein each difference result is associated with a data item of the plurality of data items.

I: The method of clause H, wherein steps a)-d) is performed for a plurality of search offsets, wherein the method further comprises:
applying each search offset of the plurality of search offsets by:
step c1) comprising selecting the corresponding second portion of the second data according to the search offset,
step d) comprising, for each data item of the plurality of data items, upon determining that the difference result calculated for the data item is lower than the difference result(s) calculated for all previous offsets for that data item, associating the search offset with the data item.

J: The method of clause I, wherein step d) comprises, upon determining that at least a threshold number of difference results in the difference data calculated for the search offset is below a threshold value, aborting the method and using the search offsets associated with the data items of the first data to determine matched blocks of data between the first data and second data K: The method of any one of clause I-J, wherein the plurality of search offsets are applied in an order according to a predefined search pattern.

L: The method of one of clause I-K, further comprising receiving a list of search offset displacements and an initial search offset, wherein the plurality of search offsets are applied in an order according to the list of search offset displacements, starting at the initial search offset.

M: The method of one of clause I-L, further comprising:
for each data item of the first data, using the search offset associated the data item to determine a motion vector between first data and second data for the data item.

N: The method of one of clause A-M, wherein the difference data is one of:
sum of absolute differences, SAD, data, or sum of squared differences, SSD, data.

O: A non-transitory computer-readable storage medium comprising a set of computer-readable instructions stored thereon which, when executed by at least one processor are arranged to cause the at least one processor to perform a block matching operation between first data and second data by:
a) configuring a buffer in internal memory of the processor for storing summed area table, SAT, data;
b) populating the buffer with initial SAT data based on a difference between at least an initial portion of the first data and second data;
c) performing an iterative process, wherein each iteration of the iterative process comprises:
c1) selecting a first portion in the first data and a corresponding second portion of the second data, wherein the selecting is performed using a sliding window approach, wherein a window used for selecting moves with a predefined window offset for each iteration;
c2) determining a subset of the first portion and a subset of the second portion;
c3) computing absolute differences, AD, data between the determined subset of the first portion and the determined subset of the second portion;
c4) computing SAT data using the computed AD data and at least a portion of the SAT data stored in the buffer;
c5) replacing a subset of the SAT data stored in the buffer with at least portions of the computed SAT data;
c6) calculating difference data between the first portion and the second portion using the SAT data stored in the buffer, wherein the difference data comprises a difference result for each of a plurality of comparisons between the first data and the second data; and
c7) storing the calculated difference data between the first portion and the second portion to memory; and
d) using the stored difference data to determine matched blocks of data between the first data and second data.

P: A processing module configured to perform a block matching operation between first data and second data, the processing module configured to:
obtain task data describing a block matching task to be executed between first data and second data;
configure a buffer in internal memory of the processor for storing summed area table, SAT, data;
populate the buffer with initial SAT data based on a difference between at least an initial portion of the first data and second data;
perform an iterative process, wherein each iteration of the iterative process comprises:
select a first portion in the first data and a corresponding second portion of the second data using a sliding window approach, wherein a window used for selecting moves with a predefined window offset for each iteration;
determine a subset of the first portion and a subset of the second portion;
compute absolute differences, AD, data between the subset of the first portion and the determined subset of the second portion;
compute SAT data using the computed AD data and at least a portion of the SAT data stored in the buffer;

replace a subset of the SAT data stored in the buffer with at least portions of the computed SAT data;

calculate difference data between the first portion and the second portion using the SAT data stored in the buffer, wherein the difference data comprises a difference result for each of a plurality of comparisons between the first data and the second data; and store the calculated difference data between the first portion and the second portion to internal memory; and using the stored difference data to determine matched blocks of data between the first data and second data.

Q: A system configured to perform a block matching operation between a first data frame and second data frame, the system comprising:

a first processing module; and a second processing module according to clause P;

wherein the first processing module is configured to:
receive input data, the input data comprises the first data frame, the second data frame and a data size;
divide the first data frame into a plurality of first data according to the data size;
divide the second data frame into a plurality of second data according to the data size; and
issue first task data describing a block matching task to be executed to the second processing module, the first task data identifying a first data among the plurality of first data, and a second data among the plurality of second data.

R: The system of clause Q, wherein the input data comprises a template block size, the template block size determining a size of the blocks of the first and second data frames used when performing the block matching algorithm, wherein the task data identifies the template block size.

S: The system of one of clause Q-R, further comprising a third processing module according to clause P, wherein the first processing module is configured to:
issue second task data describing a block matching task to be executed to the third processing module, the second task data identifying a third data among the plurality of first data, and a fourth data among the plurality of second data.

T: The system of one of clause Q-S, further comprising a fourth processing module configured to execute a compute shader, wherein the first processing module is configured to:
issue third task data identifying motion vectors between the first data frame and the second data frame to the third processing module, the motion vectors derived from the difference data stored by the first processing module during the block matching operation.

What is claimed is:

1. A method for block matching performed by a processor between first data and second data, the method comprising the steps of:
    a) configuring a buffer in internal memory of the processor for storing summed area table, SAT, data;
    b) populating the buffer with initial SAT data based on a difference between at least an initial portion of the first data and second data;
    c) performing an iterative process, wherein each iteration of the iterative process comprises:
        c1) selecting a first portion of the first data and a corresponding second portion of the second data, wherein the selecting is performed using a sliding window approach, wherein a window used for selecting moves with a predefined window offset for each iteration;
        c2) determining a subset of the first portion of the first data and a subset of the second portion of the second data;
        c3) computing absolute differences, AD, data between the determined subset of the first portion and the determined subset of the second portion;
        c4) computing SAT data using the computed AD data and at least a portion of the SAT data stored in the buffer;
        c5) replacing a subset of the SAT data stored in the buffer with at least portions of the computed SAT data;
        c6) calculating difference data between the first portion and the second portion using the SAT data stored in the buffer, wherein the difference data comprises a difference result for each of a plurality of comparisons between the first data and the second data; and
        c7) storing the calculated difference data between the first portion and the second portion to memory; and
    d) using the stored difference data to determine matched blocks of data between the first data and second data.

2. The method of claim 1, wherein the step b) comprises:
    b1) computing initial AD data between the initial portion of the first data and the initial portion of the second data;
    b2) computing the initial SAT data using the computed initial AD data;
    b3) storing the initial SAT data in the buffer.

3. The method of claim 1, further comprising:
    defining a template block size;
    wherein the step c6) is performed according to the template block size.

4. The method of claim 3, wherein the difference data calculated during an iteration of the iterative process comprises 16 difference results.

5. The method of claim 1, wherein step c2) comprises:
    determining a subset of the first portion and a subset of the second portion not previously selected during the iterative process.

6. The method of claim 1, wherein a maximum size of each SAT data item is T bits, where the step of calculating difference data between the first portion and the second portion comprises, upon determining that a difference result for a comparison between the first portion and the second portion has a negative size, adding $2^{T-1}$ to the difference result.

7. The method of claim 6, wherein T=16.

8. The method of claim 1, wherein the first data comprises a plurality of data items, wherein each difference result is associated with a data item of the plurality of data items.

9. The method of claim 8, wherein steps a)-d) is performed for a plurality of search offsets, wherein the method further comprises:
    applying each search offset of the plurality of search offsets by:
        step c1) comprising selecting the corresponding second portion of the second data according to the search offset,
        step d) comprising, for each data item of the plurality of data items, upon determining that the difference result calculated for the data item is lower than the difference result(s) calculated for all previous offsets for that data item, associating the search offset with the data item.

10. The method of claim 9, wherein step d) comprises, upon determining that at least a threshold number of difference results in the difference data calculated for the search offset is below a threshold value, aborting the method and using the search offsets associated with the data items of the first data to determine matched blocks of data between the first data and second data.

11. The method of claim 9, wherein the plurality of search offsets are applied in an order according to a predefined search pattern.

12. The method of claim 9, further comprising receiving a list of search offset displacements and an initial search offset, wherein the plurality of search offsets are applied in an order according to the list of search offset displacements, starting at the initial search offset.

13. The method of claim 9, further comprising:
for each data item of the first data, using the search offset associated the data item to determine a motion vector between first data and second data for the data item.

14. The method of claim 1, wherein the difference data is one of: sum of absolute differences, SAD, data, or sum of squared differences, SSD, data.

15. A non-transitory computer-readable storage medium comprising a set of computer-readable instructions stored thereon which, when executed by at least one processor are arranged to cause the at least one processor to perform a block matching operation between first data and second data by:
a) configuring a buffer in internal memory of the processor for storing summed area table, SAT, data;
b) populating the buffer with initial SAT data based on a difference between at least an initial portion of the first data and second data;
c) performing an iterative process, wherein each iteration of the iterative process comprises:
c1) selecting a first portion in the first data and a corresponding second portion of the second data, wherein the selecting is performed using a sliding window approach, wherein a window used for selecting moves with a predefined window offset for each iteration;
c2) determining a subset of the first portion and a subset of the second portion;
c3) computing absolute differences, AD, data between the determined subset of the first portion and the determined subset of the second portion;
c4) computing SAT data using the computed AD data and at least a portion of the SAT data stored in the buffer;
c5) replacing a subset of the SAT data stored in the buffer with at least portions of the computed SAT data;
c6) calculating difference data between the first portion and the second portion using the SAT data stored in the buffer, wherein the difference data comprises a difference result for each of a plurality of comparisons between the first data and the second data; and
c7) storing the calculated difference data between the first portion and the second portion to memory; and
d) using the stored difference data to determine matched blocks of data between the first data and second data.

16. A processing module configured to perform a block matching operation between first data and second data, the processing module configured to:
obtain task data describing a block matching task to be executed between first data and second data;
configure a buffer in internal memory of the processor for storing summed area table, SAT, data;
populate the buffer with initial SAT data based on a difference between at least an initial portion of the first data and second data;
perform an iterative process, wherein each iteration of the iterative process comprises:
select a first portion of the first data and a corresponding second portion of the second data using a sliding window approach, wherein a window used for selecting moves with a predefined window offset for each iteration;
determine a subset of the first portion of the first data and a subset of the second portion of the second data;
compute absolute differences, AD, data between the determined subset of the first portion and the determined subset of the second portion;
compute SAT data using the computed AD data and at least a portion of the SAT data stored in the buffer;
replace a subset of the SAT data stored in the buffer with at least portions of the computed SAT data;
calculate difference data between the first portion and the second portion using the SAT data stored in the buffer, wherein the difference data comprises a difference result for each of a plurality of comparisons between the first data and the second data; and
store the calculated difference data between the first portion and the second portion to internal memory; and
using the stored difference data to determine matched blocks of data between the first data and second data.

17. A system configured to perform a block matching operation between a first data frame and second data frame, the system comprising:
a first processing module; and
a second processing module according to claim 16;
wherein the first processing module is configured to:
receive input data, the input data comprises the first data frame, the second data frame and a data size;
divide the first data frame into a plurality of first data according to the data size;
divide the second data frame into a plurality of second data according to the data size; and
issue first task data describing a block matching task to be executed to the second processing module, the first task data identifying a first data among the plurality of first data, and a second data among the plurality of second data.

18. The system of claim 17, wherein the input data comprises a template block size, the template block size determining a size of the blocks of the first and second data frames used when performing the block matching ask, wherein the task data identifies the template block size.

19. The system of claim 17, further comprising a third processing module according to claim 16, wherein the first processing module is configured to:
issue second task data describing a block matching task to be executed to the third processing module, the second task data identifying a third data among the plurality of first data, and a fourth data among the plurality of second data.

20. The system of claim 17, further comprising a fourth processing module configured to execute a compute shader, wherein the first processing module is configured to:
 issue third task data identifying motion vectors between the first data frame and the second data frame to the fourth processing module, the motion vectors derived from the difference data stored by the first processing module during the block matching operation.

\* \* \* \* \*